April 11, 1939.  H. A. BAKER  2,153,909
BROACH
Filed Jan. 20, 1938
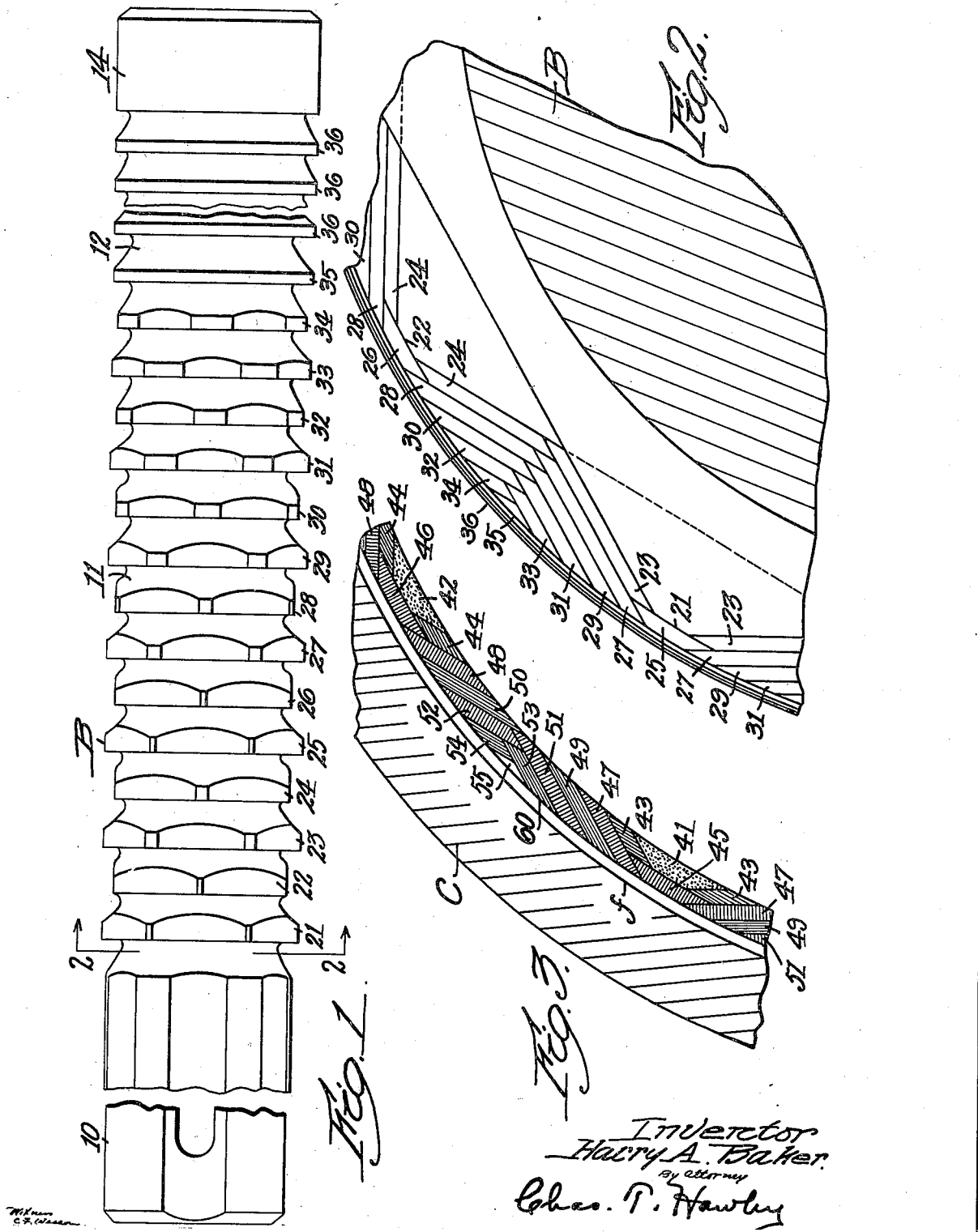

Patented Apr. 11, 1939

2,153,909

UNITED STATES PATENT OFFICE 2,153,909

BROACH

Harry A. Baker, Hudson, Mass., assignor to The LaPointe Machine Tool Company, Hudson, Mass., a corporation of Maine Application January 20, 1938, Serial No. 185,934

6 Claims. (Cl. 29—95.1)

This invention relates to cutting tools particularly designed for broaching cored holes in cast iron or other metal in which the inner surface of the cored hole has a scale or a chilled surface which is hard to cut. In addition to the hard surface, it is also commonly necessary to remove a greater thickness of stock when broaching a cored hole than when broaching a hole which has been bored or otherwise previously machined.

It is desirable, when removing scale, to make a cut deep enough to extend entirely through the scale. In order to conserve power in a deep cut, it has been heretofore proposed to remove the stock by a series of relatively narrow but deep cuts. In my prior Patent No. 1,880,656, issued October 4, 1932, I have shown a broach in which narrow deep-cutting teeth are arranged in two helical series of opposite hand. While this previously patented broach was effective for its intended purpose, the reverse helical arrangement of teeth introduced complications and expense in manufacture, which it is one object of my present invention to avoid.

My invention as disclosed in this present application comprises a broach in which the cutting teeth are arranged in two longitudinal series, as in my patented broach, but in which the teeth in said two series are disposed in parallel, spaced and preferably axial lines.

A further object of the invention is to provide a broach of the type described in which the teeth in each series are made progressively higher or progressively wider or both, until the teeth in one series substantially overlap the teeth in the other series and the scale is almost entirely removed, whereupon cutting elements each having a continuous cutting edge may be substituted for trimming and finishing the hole, which is commonly but not necessarily cylindrical.

My invention further relates to arrangements and combinations of parts which will be hereinafter described and more particularly pointed out in the appended claims.

A preferred form of the invention is shown in the drawing, in which

Fig. 1 is a side elevation of a broach embodying my improvements and designed for broaching cylindrical holes;

Fig. 2 is an enlarged partial transverse sectional view of the broach; taken along the line 2—2 in Fig. 1; and Fig. 3 is a partial enlarged sectional view of a piece of work, indicating the manner in which portions of stock are successively removed.

Referring to Fig. 1, I have shown a broach B particularly designed to broach a cored hole of circular cross section in cast iron or other metal having scale or chilled metal on its inner surface.

The broach comprises a shank 10 adapted to be secured to the puller head of a broaching machine, a roughing portion 11, a finishing portion 12, and a guide portion 14.

The cutting teeth in the roughing portion 11 of the broach are disposed in parallel and axial series, the teeth of the odd numbered cutting sections being disposed in one series and the teeth of the even numbered sections being disposed in a second but parallel series. The cutting sections are shown herein as generally hexagonal in shape, but any other desired polyangular section may be used.

In Fig. 1 I have designated the teeth of the first cutting section by the numeral 21, the teeth of the second cutting section by the numeral 22 and so on progressively to 34, and in Fig. 2 I have indicated the teeth in the different successive sections by the same numbers.

The finishing portion 12 of the broach comprises a first cutting section 35 of circular cross section, which completes the roughing of the hole to circular outline. Successive circular cutting sections 36 in the finishing portion remove the small amount of stock left after the roughing cut and bring the hole to exact size, the last few sections 36 being the full size of the finished hole. The guide portion 14 is also of circular cross section and is a sliding fit in the finished hole.

In Fig. 3 I have shown a portion of a casting C in which a circular hole is to be broached, the finish line of the hole being indicated by the letter f.

In broaching the hole, the stock is removed by the roughing teeth of the broach in the following manner:—Each tooth 21 on the first cutting section removes stock as indicated by the numeral 41. Each tooth 22 removes stock as indicated at 42.

It will be evident that these successive teeth 21 and 22 cut successive and relatively deep axial grooves through the scale at points substantially spaced apart circumferentially. With the hexagonal broach shown in Figs. 1 and 2, these grooves will be spaced apart by $\frac{1}{12}$th of a circumference or 30°.

The teeth 23 and 24 then remove portions of stock 43 and 44 at each side of the cuts 41 and 42. The teeth 25 and 26 next remove the stock indicated by the numerals 45 and 46 respectively, deepening the cuts. The teeth 27 to 34 then each remove two narrow and oppositely inclined strips of stock at the two opposite sides of each previously formed groove, as indicated by the numerals 47 to 54 inclusive.

The small triangular portions of stock 55 remaining between the adjacent cuts 33 and 34 are removed by the first circular cutting section 35, thus completing the roughed out circular hole indicated by the numeral 60.

Thereafter, successive circular cutting sections 36 slightly enlarge the hole 60 and bring it to the finish size indicated by the letter *f*.

It will thus appear that I am able by the use of my improved broach to remove the chilled inner surface or scale in a cored hole by a series of successive cuts, each of which is relatively deep and extends entirely through the chilled or scale surface, this being the approved manner of machining such a surface.

It will also be evident that all of the cutting teeth are in axial alignment and that all of the cutting teeth of the hexagonal cutting sections of one series are at $\tfrac{1}{12}$th of a circumference or 30° from the teeth of the other series. Consequently, in forming and grinding the broach, only two angular positions are necessary, which positions are 30° apart. The manufacture of the broach is thus much simpler than in the form shown in my prior patent, in which successive teeth were displaced progressively in two helical series of opposite hand.

It will be further noted that each cutting tooth in each hexagonal section cuts on both sides, thus providing increased cutting surface and eliminating any tendency of the broach to twist or rotate.

While I have shown the cutting sections as of hexagonal outline, the number of rows of teeth may be varied within relatively wide limits, the number of teeth depending on the size of the broach and on the depth of the cut. As the diameter of the hole to be broached increases, the number of cutting teeth in each cutting section will in general be correspondingly increased.

The outline of the finished hole need not be circular but may be oval, eliptical or of any similar and desired section. The broach is most largely used, however, for broaching cylindrical holes.

Having thus described my invention and the advantages thereof, I do not wish to be limited to the details herein disclosed, otherwise than as set forth in the claims, but what I claim is:—

1. A broach comprising a plurality of polyangular cutting sections having cutting portions at the angles of said sections and circumferentially spaced apart, said sections being axially arranged in two separate cutting series, with the odd sections forming one series and the even sections forming a second series, the cutting teeth in each series being axially aligned and each row of teeth in one series being disposed between two adjacent rows of teeth in the other series and having the peripheral edge portions of its teeth out of axial alignment with the peripheral edge portions of the teeth in the other series.

2. A broach comprising a plurality of polyangular cutting sections having cutting portions at the angles of said sections and circumferentially spaced apart, said sections being axially arranged in two separate cutting series, with the odd sections forming one series and the even sections forming a second series, the cutting teeth in each series being axially aligned and each row of teeth in one series being disposed between two adjacent rows of teeth in the other series and being equally spaced angularly therefrom and having the peripheral edge portions of its teeth out of axial alignment with the peripheral edge portions of the teeth in the other series.

3. A broach comprising a plurality of polyangular cutting sections having cutting portions at the angles of said sections and circumferentially spaced apart, said sections being axially arranged in two separate cutting series, with the odd sections forming one series and the even sections forming a second series, the cutting teeth in each series being axially aligned and each row of teeth in one series being disposed between two adjacent rows of teeth in the other series and having the peripheral edge portions of its teeth out of axial alignment with the peripheral edge portions of the teeth in the other series, and the major part of said cutting teeth having cutting edges at both sides, each of which edges makes a relatively deep but narrow cut in the work.

4. A broach comprising a roughing portion having a plurality of polyangular cutting sections having cutting portions at the angles of said sections and circumferentially spaced apart, said sections being axially arranged in two separate cutting series, with the odd sections forming one series and the even sections forming a second series, the cutting teeth in each series being axially aligned and each row of teeth in one series being disposed between two adjacent rows of teeth in the other series and having the peripheral edge portions of its teeth out of axial alignment with the peripheral edge portions of the teeth in the other series, said broach also having a finishing portion comprising a plurality of cutting sections having cutting edges which are continuous around the broach and which trim the hole to the designated size.

5. A broach comprising a plurality of polyangular cutting sections having cutting portions at the angles of said sections and circumferentially spaced apart, said sections being axially arranged in two separate cutting series, with the odd sections forming one series and the even sections forming a second series, the cutting teeth in each series being axially aligned and each row of teeth in one series being disposed between two adjacent rows of teeth in the other series, the first tooth in each series cutting a deep narrow groove, the second tooth removing a deep narrow strip at each side of said groove, the third tooth deepening the cut made by said first and second teeth, and successive teeth each removing deep narrow strips from both sides of said deepened groove.

6. A broach as set forth in claim 5, in which additional cutting sections are provided, each having a cutting edge which is continuous around said broach, said additional sections completing the hole to designated size.

HARRY A. BAKER.